Patented Apr. 5, 1927.

1,623,599

UNITED STATES PATENT OFFICE.

CHARLES B. JACOBS, OF WILMINGTON, DELAWARE, ASSIGNOR TO E. I. DU PONT DE NEMOURS & COMPANY, OF WILMINGTON, DELAWARE, A CORPORATION OF DELAWARE.

METHOD OF REMOVING CYANIDES FROM MASSES CONTAINING THE SAME.

No Drawing. Application filed March 10, 1921. Serial No. 451,094.

This invention relates to a method of removing cyanides from masses containing them, and of removing liquids from cyanized furnace product containing the same. More particularly it relates to the removing of alkali metal cyanides from cyanized furnace product obtained by treating charges of alkali metal carbonate and carbon (and oxide of iron) at high temperatures with nitrogen, to produce the cyanide, the chemical reaction involved when sodium carbonate is used, being empirically expressed by the equation

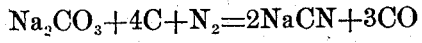
$$Na_2CO_3 + 4C + N_2 = 2NaCN + 3CO$$

It is the object of the invention to provide such a method and also to improve generally upon methods of the character indicated. While the method is not restricted to the removal of sodium cyanide, for convenience and by way of example, I describe it with more particular reference to sodium cyanide.

The furnace product having been obtained as aforesaid, the next problem is, of course, the removal of the cyanide therefrom. It is possible, and indeed quite feasible, to remove it by counter-current-wise leaching with several, say six, masses of water, if desired partially in the form of mother liquor obtained by crystallizing cyanide from water used in a previous operation. But the multiplicity of operations, the large amount of handling of various solutions, the working with many masses in various stages of treatment, and various other features, such as concentrating of solutions and so forth, that will occur to those skilled in the art, make counter-current leaching a method for which I have sought a substitute. I turned to digesting the furnace product with water to dissolve the cyanide and then removing the cyanide solution from the mass by centrifugal separation, filtering, filter pressing, or the like, as possibly a workable substitute offering advantages over the leaching, but I was confronted with the difficulty that it is not possible to remove sufficient solution by centrifugal separation or the like, to make the procedure commercially possible. For example, when working with a saturated solution containing substantially all the cyanide present—a saturated solution being of course desirable in order to keep the amount of liquid to be handled at a minimum—I was able by centrifugal separation or the like to remove only about 69 to 70% of solution, saturated with furnace-product cyanide, indicating the non-removal from the mass, of digested furnace product and solution, of about 30 to 31% of the cyanide in the furnace product. Very evidently the difficulty was fundamental as the non-recovery of about 30% of the cyanide, or indeed percentages even much less than that, was of course not to be thought of. It appeared that a digestion-and-solution-removal method was not practically possible.

But upon further investigation I made this discovery:—It is entirely possible to substantially entirely remove liquid, e. g. sodium cyanide solution, even though the solution be a saturated one, from digested furnace product containing the same, by subjecting the mass to directly applied relatively high pressure, as with a hydraulic press. Furthermore, not only is it possible but it is wholly practical and feasible from a commercial point of view—the pressures desirable are not excessive, for example 2200 to 6000 pounds per square inch, and so may be conveniently applied; and the required time of application is quite short. A saturated solution, although it, as mentioned above, is desirable for various reasons is, as compared to an unsaturated one, relatively difficult to remove and, furthermore, any portion not removed represents a more serious loss of cyanide than a like portion of non-saturated solution would, as is evident; but I am enabled to remove from the mass of digested furnace product and saturated solution about 98 to 99% of the solution saturated with furnace-product cyanide indicating a recovery of about those percentages of the cyanide.

By virtue of the discovery then, I am able, while practicing the desirable digestion-and-solution-removal method, to remove such large percentages of cyanide that the method is workable from a commercial standpoint.

Although if desired all removing of solution can be done by directly applied relatively high pressure, it is desirable to work by initially removing some of the liquid by centrifugal separation, filtering, filter pressing. or the like, and, as indicating not only how relatively little may be accomplished by centrifugal separation alone but also how great is the efficacy of hydraulic pressing, the following table of results, obtained by pressing centrifuge cakes which had already had their solution (and cyanide) content reduced substantially as far as practicable by centrifugal separation, is of interest. The cyanized furnace product comprised substantially 50 parts by weight of sodium cyanide, 13 of sodium carbonate, 24 of iron and 11 of carbon; substantially just sufficient water was used to dissolve all the cyanide present giving a saturated solution; the water used contained a proper amount of sodium carbonate to ensure that at the temperature used in the digesting and so forth no carbonate would be removed from or deposited on the furnace product so that except for change in the cyanide content and, of course, the presence of water sufficient to hold all the cyanide present in solution, the centrifuge cake contained substantially the same amounts of materials as originally present in the furnace product; the digestion, centrifugal separation and pressing were carried on at about 36° to 40° C. so that the water used to obtain the saturated solution of the cyanide in the furnace product was about 100 parts by weight of water to 68 parts of the cyanide present; and the centrifuge cakes as used in the press were about 1¾ inches thick (diameter 2 inches):—

| Sample. | % NaCN in cake before pressing. | Pressure lbs. per sq. in. | Time minutes. | % NaCN in press cake. |
|---|---|---|---|---|
| 1 | 17.4 | 2200 | 8 | 2.17 |
| 2 | 18.15 | 3600 | 4 | 1.1 |
| 3 | 18.15 | 3600 | 8 | 0.94 |
| 4 | 18.15 | 4000 | 4 | 2.00 |

Average weight of press cake 130 lbs. per cu. ft.

Noting that a saturated solution, ratio of water to cyanide 100:68, was used, that substantially all cyanide dissolved and that substantially none of the other constituents of the furnace product dissolved, it will be seen that the centrifugal separation could remove but about 69 to 70% of the furnace-product cyanide (in saturated solution) from the mass of digested furnace product and solution, whereas the directly applied pressure resulted in the removal of about 98 to 99% of the cyanide present in the cyanized furnace product, as previously mentioned.

As a matter of fact, in the tests water comprising mother liquor from a previous operation and already containing 38 parts of cyanide to 100 of water was used for the digesting, substantially just enough of this being used to take up all the cyanide present in the furnace product (and of course hold in solution the 38 parts already present) so that the amount of cyanide in the cakes was, in part, some of the cyanide that was initially in the mother liquor. The percentages of cyanide (and solution) removable, and previously given as 69 to 70%, and 98 to 99% were of course arrived at by considering that water without cyanide, and substantially just sufficient to dissolve the cyanide in the furnace product, was used for the digesting, and that consequently all cyanide in the cakes was furnace-product cyanide (using 17.5% and 1.5% as representative of the cyanide content of the centrifuge cakes and the press cakes respectively). So the true percentages of liquid (and total cyanide) removed and furnace-product cyanide removed would be slightly more favorable to the centrifuging and the pressing then those given, the difference between the centrifuge percentages given and the exact percentages of course being without significance.

If desired for any reason water in excess of that required to give a saturated solution can be used and of course the water used need not be in the form of mother liquor. Also, the expulsion of the solution need not be carried so far as in the tests; but for commercial reasons it is preferable to expel sufficient solution to give a recovery of at least 94 to 95% of the cyanide in the furnace product, that is, in the case of a furnace product of substantially the character indicated, it is preferable to reduce the cyanide content of the press cake to below substantially 5%.

Any suitable digesting and initial-removal apparatus may be used. Any of the ordinary types of hydraulic press with a drainage head for supporting the cake and draining off the liquid and also provided with a holder, or series of holders, for forming the cake between the upper head and the lower, or drainage, head of the press, and with means for heating the cake, substantially such as a cocoa or powder press for example, may be used in carrying on the pressing. A pressure of, say 220 to 6000 pounds per square inch may be used; about 4000 pounds should be generally satisfactory. The time of pressing will of course depend on the amount of solution to be removed, the thickness of the cake and like factors, but the time need not be long, perhaps a quarter of an hour. The various operations of dissolving the cyanide and removing the solution should of course be carried on at a temperature such as to insure the ready dissolving of the cyanide and its remaining in solution. In the case of removing sodium cyanide, and a furnace product containing sodium carbonate, it is desirable to carry on the operations between about 33.5° C. (the transition point NaCN⇌NaCN.2H$_2$O) to 40° C., and preferably at the temperature of maximum solubility of the cyanide, say about 36° to 40° C.; it is desirable as before noted to work with a staturated solution. At the mentioned temperatures the mutual solubilities of sodium cyanide and carbonate are about 68 grams of cyanide and 5 grams of carbonate to 100 grams of water giving a solution saturated with respect to both; in accordance with this, in the tests previously mentioned about 5 parts of carbonate to each 100 parts of all the water used in the digesting were used and, as before mentioned the temperatures used in the digesting, initial separation and pressing were about 36° to 40° C.

When a furnace product of roughly the character indicated is treated (digested) with substantially just sufficient water at 33.5° C. to 40° C. to take up all the cyanide in the furnace product, the solution containing about 68 parts of cyanide and 5 parts of carbonate per 100 parts of water, there results a mixture, or mass, thin enough to stir well, and be conveniently subjected to centrifugal separation, and the saturation of the water with cyanide takes place rapidly. These facts, coupled with the fact that liquid, and particularly a cyanide-carbonate solution such as that just mentioned, can be substantially entirely removed from masses containing the same by directly applied relatively high pressure, enables me to derive crystallized sodium cyanide from cyanized furnace product in a most advantageous manner:—

As before indicated the mutual solubilities of sodium cyanide and sodium carbonate in water are such that at about 33.5° C. to 40° C. 100 parts of water will hold about 68 parts of cyanide and 5 parts of carbonate in solution, about 36° to 40° C. being the temperature of maximum solubility of the cyanide. Moreover, the solubility of the carbonate increases and that of the cyanide decreases as the temperature is lowered, so that by cooling to about 8° to 10° C. a satisfactory proportion of the cyanide can be crystallized out, leaving the carbonate in solution. Furthermore, the dissolving is selective for cyanide, that is, should, initially, more than 5 parts of carbonate per 100 of water go into solution, the cyanide, in continuing to dissolve, will throw out any carbonate in excess of 5 parts; so by saturating with cyanide, all carbonate in the mass treated, say cyanized furnace product, will remain therein, assuming of course that the 5 parts of carbonate per 100 of water are present in the water before treatment of the furnace product. Thus, furnace product can be treated without extraction of carbonate, leaving the carbonate readily available for the making up of new charges for the retorts. It is advisable to use mother liquor in the digesting, instead of entirely new quantities of water, as it eliminates the taking up of additional quantities of cyanide which can not be readily crystalized out. In view of these facts and considerations, it will be seen that the procedure may very advantageously be as follows:—

A batch of cyanized furnace product is digested at a temperature between 33.5° to 40° C., preferably 36° to 40° C., with substantially just sufficient water to dissolve all the cyanide, about 100 parts of water to 68 of cyanide, and also hold about 5 parts of sodium carbonate per 100 of water (the carbonate may be initially added to the water or be extracted from this first batch as desired). While maintaining the mentioned temperature the mass is filtered, centrifugally separated, or the like, to initially remove say 69 to 70% of the solution, and the resulting cake pressed in a hydraulic press at a pressure of about 4000 pounds per square inch until, say, not over about 5 to 6% of the original amount of the solution remains. The two bodies of solution are united and cooled to a temperature of about 8 to 10° C. to crystallize out cyanide; and the crystals and mother liquor separated in any desirable manner. Merely sufficient water to replace that lost in the crystallizing is now added to the mother liquor, and, using this augmented mother liquor, a batch of furnace product containing substantially just sufficient cyanide to saturate the liquid, is digested at about 33.5° C. to 40° C., preferably 36° to 40° C., the mass, while maintaining such temperature, is centrifuged and pressed to at each step remove solution approximately to the extents previously mentioned; the cyanide is crystallized; the mother liquor augmented as before; and so on.

It will be understood that, although certain of the claims, for convenience, refer to centrifugal separation, I do not thereby exclude operations such as filtering and the like as, from the view point of the invention, they are but equivalents of centrifugal separation, i. e. operations for conveniently and initially removing a certain amount of the liquid to place the mass in more convenient condition for pressing.

Although I have made more particular reference to the removal of sodium cyanide from cyanized furnace product, I do not confine the invention thereto. Obviously, too, in referring to "water" in the claims, I do not exclude mother liquor.

I claim:—

1. The method of removing alkali metal cyanide from cyanized furnace product containing the same which comprises digesting the same with substantially merely sufficient water, comprising mother liquor resulting from removing cyanide from a cyanide solution obtained by a previous operation, to give a substantially saturated solution, and subjecting the mass to directly applied relatively high pressure to expel cyanide solution.

2. The method of removing sodium cyanide from cyanized furnace product containing the same which comprises digesting the product with substantially merely sufficient water, at a temperature above the transition point from hydrate to anhydrous sodium cyanide, to dissolve the cyanide, and subjecting the mass to directly applied relatively high pressure to expel cyanide solution therefrom, while maintaining the mass at a temperature above said transition point.

3. The method of removing sodium cyanide from cyanized furnace product containing the same which comprises digesting the product with substantially merely sufficient water at a temperature between substantially 36° and 40° C., to dissolve the cyanide, and subjecting the mass to directly applied relatively high pressure to expel cyanide solution therefrom, while maintaining the mass at substantially said temperature.

4. The method of removing sodium cyanide from cyanized furnace product containing the same which comprises digesting the product with substantially merely sufficient water at a temperature above the transition point from hydrate to anhydrous sodium cyanide, to dissolve the cyanide, and subjecting the mass to directly applied relatively high pressure to expel cyanide solution therefrom, while maintaining the mass at a temperature above said transition point, and continuing the application of the pressure until at least substantially 94 to 95% of the cyanide is removed.

5. The method of removing sodium cyanide from cyanized furnace product containing the same which comprises digesting the product with substantially merely sufficient water, at a temperature between substantially 36° and 40° C., to dissolve the cyanide, and subjecting the mass to directly applied relatively high pressure to expel cyanide solution therefrom, while maintaining the mass at substantially said temperature; and continuing the application of the pressure until at least substantially 94 to 95% of the cyanide is removed.

6. The method of removing sodium cyanide from cyanized furnace product containing the same which comprises digesting the product with substantially merely sufficient water, comprising mother liquor resulting from crystallizing sodium cyanide from a cyanide solution obtained by a previous operation, at a temperature above the transition point from hydrate to anhydrous soduim cyanide, to dissolve the cyanide, and subjecting the mass to directly applied relatively high pressure to expel cyanide solution therefrom, while maintaining the mass at a temperature above said transition point, and continuing the application of the pressure until at least substantially 94 to 95% of the cyanide is removed.

7. The method of removing cyanide from masses containing the same which comprises treating the mass with a solvent for the cyanide to dissolve the same, subjecting the mass to centrifugal separation to reduce the cyanide solution content thereof, and then subjecting the mass to directly applied relatively high pressure to further reduce the cyanide-solution content.

8. The method of removing cyanide from masses containing the same which comprises treating the mass with a solvent for the cyanide to substantially entirely dissolve the same, subjecting the mass to centrifugal separation to partially remove the cyanide solution, subjecting the mass to directly applied relatively high pressure to expel cyanide solution therefrom, and continuing the application of the pressure until the cyanide solution is substantially entirely removed therefrom.

9. The method of removing cyanide from masses containing the same which comprises treating the mass with a solvent for the cyanide, subjecting the mass to centrifugal separation to remove sufficient cyanide solution to reduce the cyanide content of the mass to about 17 to 18%, and then subjecting the mass to directly applied relatively high pressure to further remove cyanide solution from the mass.

10. The method of removing cyanide from masses containing the same which comprises treating the same with a solvent for the cyanide to dissolve substantially all of the cyanide, subjecting the mass to centrifugal separation to partially remove the cyanide solution, and then subjecting the mass to directly applied relatively high pressure for a sufficient time to remove sufficient cyanide solution to reduce the cyanide content of the mass to below substantially 5%.

11. The method of deriving alkali metal cyanide from successive batches of cyanized furnace product containing the same which comprises digesting, a first batch, with substantially merely sufficient water to dissolve the cyanide and give a substantially saturated solution, subjecting the mass to directly applied relatively high pressure while substantially maintaining the temperature, to approximately fully remove the cyanide solution, cooling the solution to remove cyanide therefrom, separating the cyanide and mother liquor; digesting a second batch with the mother liquor to obtain a substantially saturated solution, applying pressure, cooling and removing cyanide substantially as before; and so on.

12. The method of deriving crystallized sodium cyanide from successive batches of cyanized furnace product containing the same which comprises digesting a first batch, with substantially merely sufficient water to dissolve the cyanide and give a substantially saturated solution, subjecting the mass to directly applied relatively high, mechanical pressure while substantially maintaining the temperature, to approximately fully remove the cyanide solution, cooling the solution to crystallize cyanide therefrom, separating the crystals and mother liquor; adding water to the mother liquor to replace that lost in crystallizing, digesting a second batch with the augmented mother liquor to obtain a substantially saturated solution, applying pressure, cooling and removing crystals substantially as before; and so on.

In testimony whereof I affix my signature.

CHARLES B. JACOBS.